(12) United States Patent
Wu

(10) Patent No.: US 7,062,057 B2
(45) Date of Patent: Jun. 13, 2006

(54) RECHARGEABLE HEARING AID

(76) Inventor: Chih Hsien Wu, P.O. Box 82-144, Taipei (TW)

( * ) Notice: Subject to any disclaimer, the term of this patent is extended or adjusted under 35 U.S.C. 154(b) by 350 days.

(21) Appl. No.: 10/642,207

(22) Filed: Aug. 18, 2003

(65) Prior Publication Data

US 2005/0041827 A1 Feb. 24, 2005

(51) Int. Cl.
*H04R 25/00* (2006.01)

(52) U.S. Cl. .................. 381/323; 381/312; 381/380

(58) Field of Classification Search .............. 381/380, 381/323, 312; 429/96, 97, 100; 320/107, 320/108, 111
See application file for complete search history.

(56) References Cited

U.S. PATENT DOCUMENTS 5,253,300 A * 10/1993 Knapp .................. 381/323

* cited by examiner

*Primary Examiner*—Curt Kuntz
*Assistant Examiner*—Tuan Duc Nguyen
(74) *Attorney, Agent, or Firm*—Leong C. Lei

(57) ABSTRACT

A rechargeable hearing aid comprises a battery charger and a hearing aid body. The battery charger presents an easily carried case, which is provided with a receiving groove and a battery chamber, which contains a dry battery for power supply. The receiving groove can receive the hearing aid body and is provided with connection terminals at two sides of the inner groove for flexibly locking the hearing aid body. A cover covers on the receiving groove and is pivotally connected to the bather charger by a hinge element, which is further connected to a switch, such that when the cover is in the position of OFF, the battery can start recharging right away, and be quickly completed with micro-voltage.

2 Claims, 7 Drawing Sheets

RECHARGEABLE HEARING AID

BACKGROUND OF THE INVENTION (a) Technical Field of the Invention

The present invention relates to a design of rechargeable hearing aid, particularly to an improvement of hearing aid, which is derived from the modem ones and can be recharged to facilitate the user to operate. Meanwhile, the costs of batteries can be minimized and the life of use of the hearing aid can be lasted.

(b) Description of the Prior Art

Hearing aid is a great invention to those with bad faculty of hearing. Hearing deficiencies can be caused by tympanitis, living long time in harsh noise, inherent reasons, disease or inbred deficiency, aging, accidence, injury, medical hurt, etc. Fortunately, most people with bad faculty of hearing can be helped by the hearing aid. Hearing aids of various function and features can satisfy different degree of hearing deficiency. Hearing aids nowadays are even programmed to make response to micro-sound, so as to transmit more clear and melodious sound to make the user better understanding.

However, most rechargeable hearing aids of prior art is provided with a depression for receiving the battery which is connected to a liftable pivot. When the power is insufficient and the battery need be renewed, the user must open the small element carefully, take out the consumed battery and renew the battery. These operations are inconvenient to those aged who are the greatest group using the hearing aids. The disadvantages could be:

1. The parts of the hearing aid are too small to be held in hands by those aged, given the blurred vision and shaking hands.
2. The size of the batteries for the hearing aid is overly small, rendering hard recognition of the negative and positive contacts. Therefore, wrong installation would happen all the time and make the batteries get stuck. If the cover is further affixed by force, the locking pin would be broken, shortening the life of use of the hearing aid.
3. The battery for conventional hearing aid used to contain small volume and would be consumed in five days in the case of six hours a day, or 3.75 days in the case of eight hours a day. At this rate, each user would consume about 100 batteries per year, each battery for US$3, costing US$300 per year. This is apparently uneconomic!
4. The estimated 100 batteries per year for each user would render a problem in environment, in case those consumed batteries are not properly recycled.
5. If the hearing aid is power insufficient in use, such as in the cinema, out for picnic, or ride at night, there is difficulty for the user to take the hearing aid to a place under the light for change of batteries. The inconvenience caused by temporary hearing inefficiency is also bothersome.

In view of the above, the invention provides a hearing aid structure without interference by the outside environmental cause.

SUMMARY OF THE INVENTION

The primary object of the invention is to provide a rechargeable hearing aid, the power of which can be recharged by way of the simply designed battery charger which is adapted to the hearing aid. The invention can facilitate those aged to easily operate anywhere.

The secondary object of the invention is to provide a rechargeable hearing aid, the batteries of which need not be changed always, nor the components, such as cover, would be broken easily due to frequent operation.

Another object of the invention is to provide a rechargeable hearing aid, which can be portable with the user. The light on the battery charger can provide proper rays at the time of opening the cover and tugging the hinge element, so that the user can search out the socket for recharge purposes, even if in the outdoors without any light source.

To obtain the above objects, the invention comprises a battery charger and a hearing aid body. The battery charger presents an easily carried case, which is provided with a receiving groove and a battery chamber, which contains a dry battery for power supply. The receiving groove can receive the hearing aid body and is provided with connection terminals at two sides of the inner groove for flexibly locking the hearing aid body. A cover covers on the receiving groove and is pivotally connected to the bather charger by a hinge element, which is further connected to a switch, such that when the cover is on the position of "off", the battery can be in the process of recharge right away, and be quickly recharged with micro-voltage.

To better understand the characteristics and structure of the present invention, a detailed description of the preferred embodiments is further provided hereafter.

DETAILED DESCRIPTION OF THE PREFERRED EMBODIMENT

Figure 1:
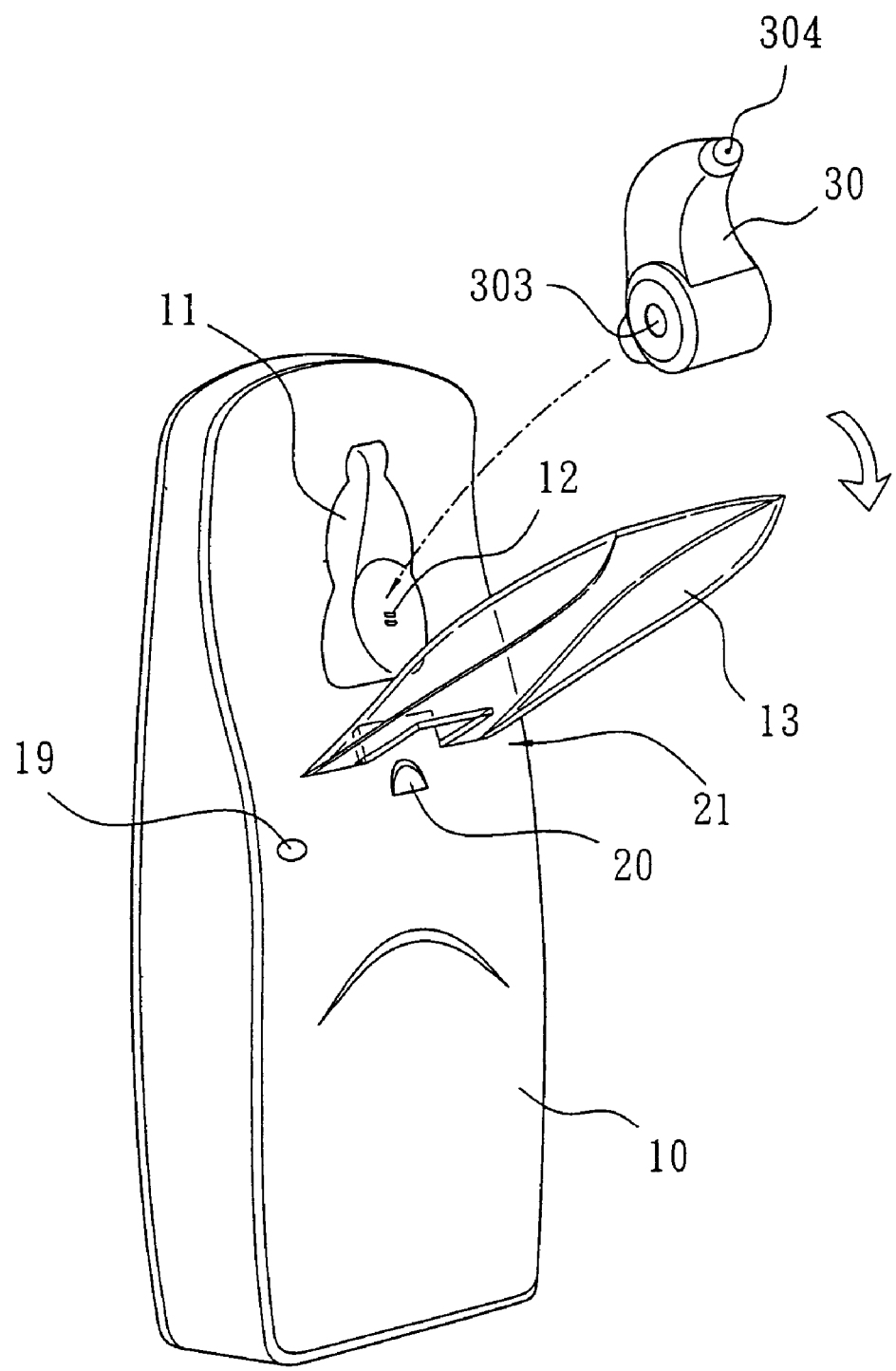
FIG. 1 is an exploded view of the invention.
Figure 2:
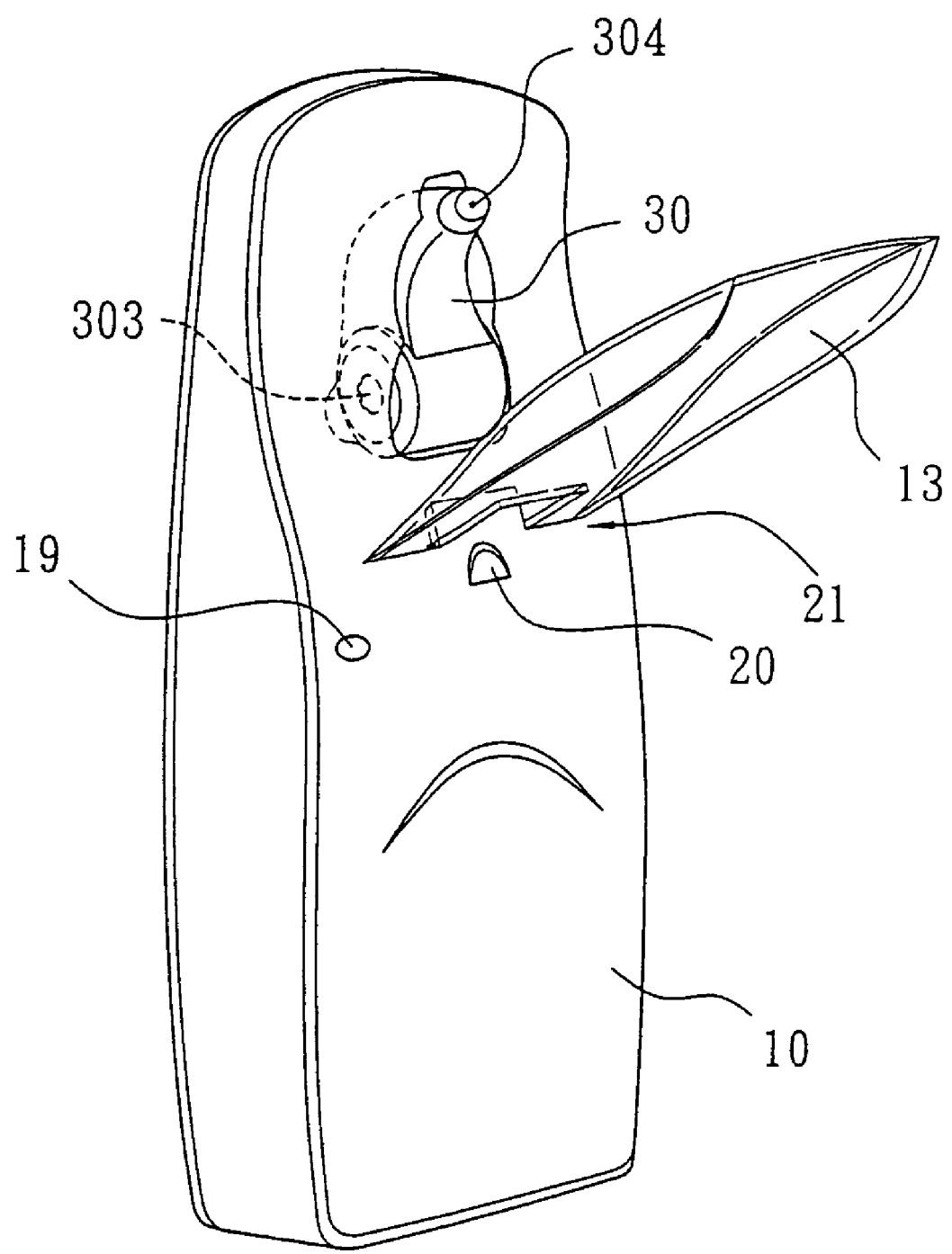
FIG. 2 shows disposing the hearing aid into the battery charger.
Figure 3:
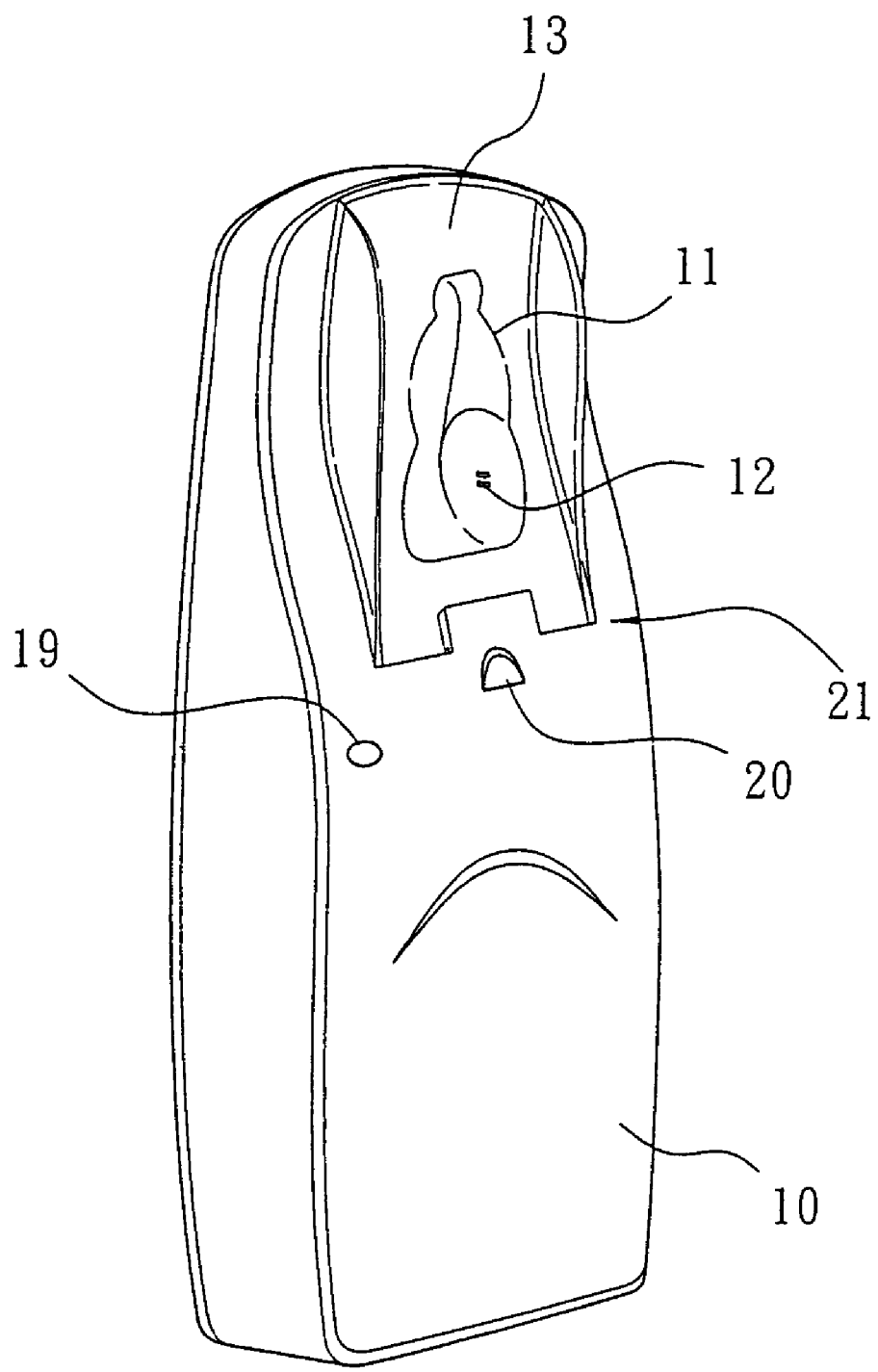
FIG. 3 shows the battery charger with the cover closed.
Figure 4:
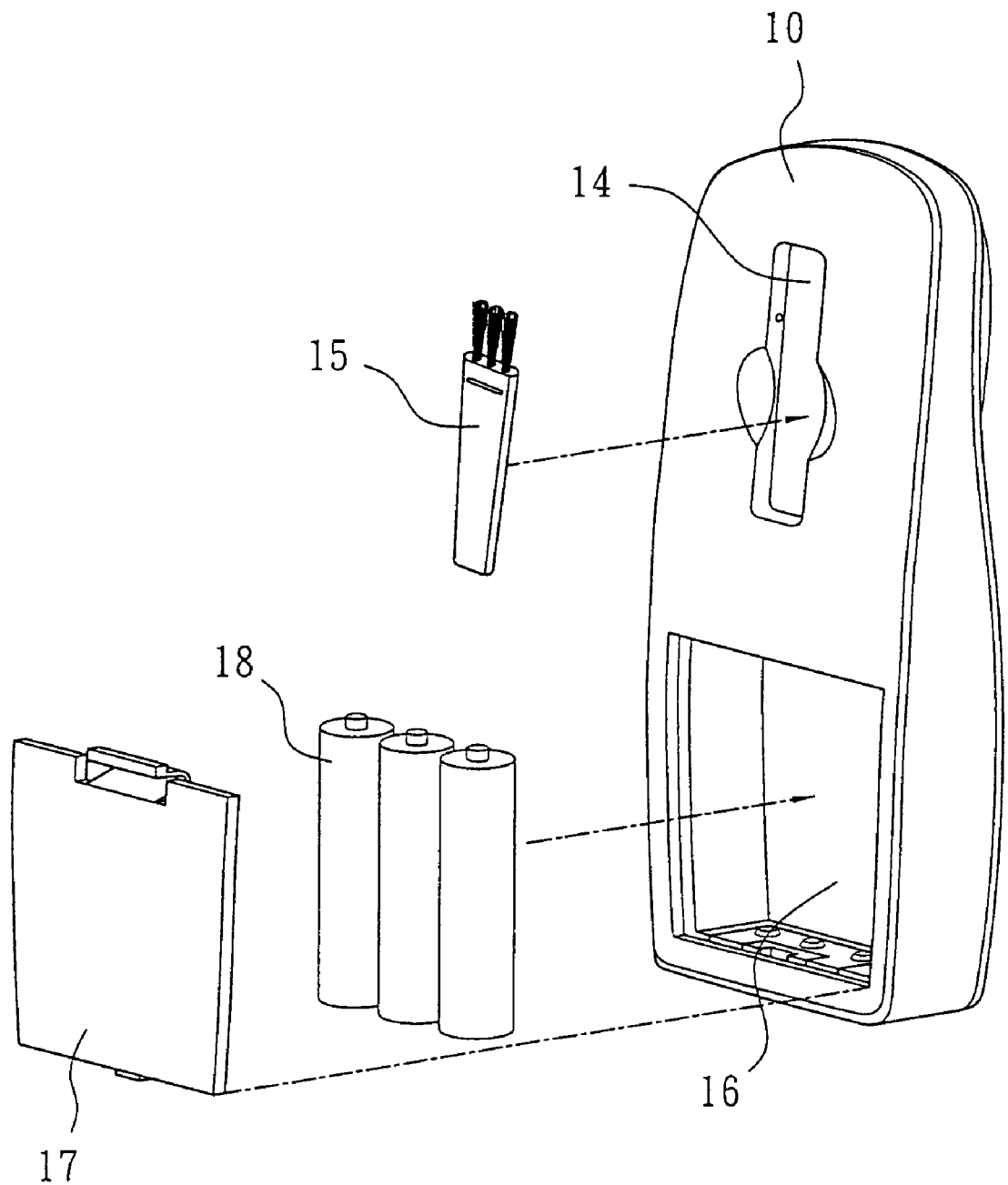
FIG. 4 is a perspective view of the back of the battery charger.

Referring to FIGS. 1 to 4, the rechargeable hearing aid comprises a battery charger 10 and a hearing aid body 30. The battery charger 10 presents an easily carried case, which is provided with a receiving groove 11 and a battery chamber 16. The receiving groove 11 provided at the front surface of the battery charger 10 is adapted to the shape of the hearing aid body 30, and is provided with flexible connection terminals 12 at two sides of the inner groove 11. The receiving groove 11 is pivotally connected to a cover 13 by way of a hinge element 21, and is provided therebelow with a charging indicator 19 and a light 20, the switch therefore is connected to the hinge element 21 (inside of the housing, not shown). Being controlled by the cover 13, the batter charger 10 is provided at the back with a clamping groove 14 for receiving a cleaning brush 15 and a battery chamber 16 which is provided with a cover 17 and is for disposing dry batteries 18.

The hearing aid body 30 is designed for adapting to human ears. A receiver is provided at the front end, and electric capacitors (contacts) at two sides. The circuits inside of the receiver comprise a microphone 301, a plurality of resistors, a variable resistor 302, a plurality of electric capacitors and chips, and an earphone 304.

Figure 5A:
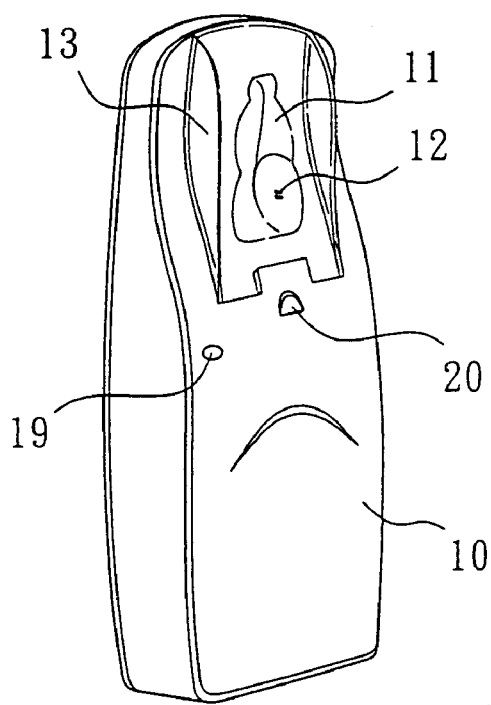
FIGS. 5A and 5B show combining the batter charger with a carrying leather case.
Figure 5B:
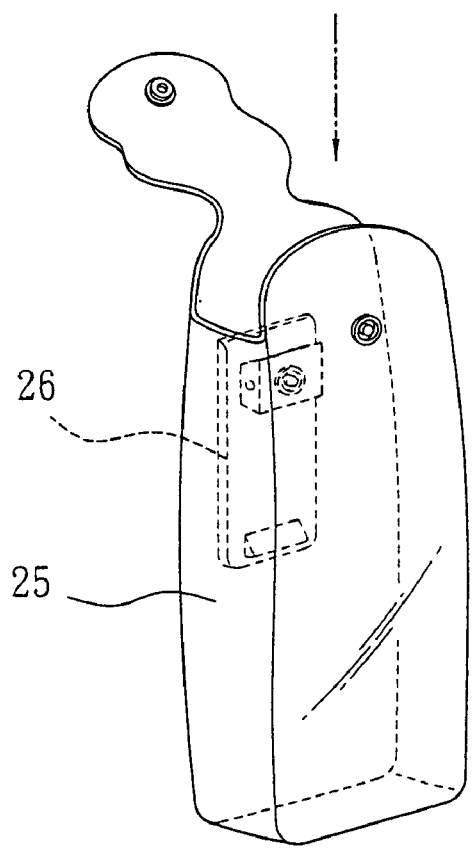

Referring to FIGS. 5A and 5B, the invention is further provided with a for containing the battery charger 10. As the back of the leather case 25 is provided with a buckled clip 26 for fastening to the belt of the user, it not only can protect the battery charger 10, but also can facilitate the user to carry with.

Figure 6:
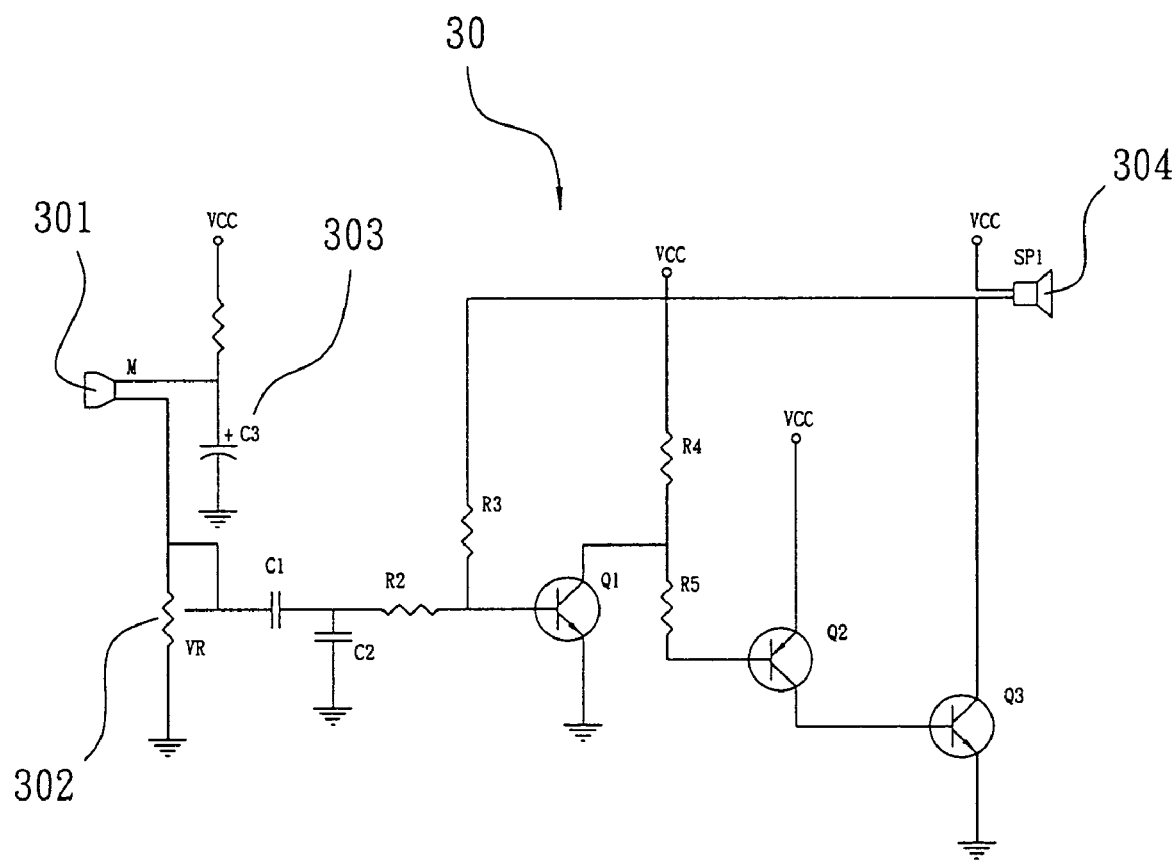
FIG. 6 is a circuit diagram of the hearing aid body.

As shown in FIG. 6, the sound collected by the microphone 301 can be amplified by the amplifier circuits composed of the above-mentioned resistors, electric capacitors and chips, and then broadcasted through the earphone. The variable resistor 302 is used for adjusting the volume of the microphone 301, whereas one of the electric capacitors 303 (earphone contact) can provide power by way of connecting to the two contacts, such that when the hearing aid body 30 is in the status of power insufficiency, as the user can open the cover 13 of the battery charger 10, the light 20 would provide proper rays to ease the user to dispose the hearing aid body 30 in the receiving groove 11. The electric capacitors 303 (contacts) will provide electric power through dry batteries 18 for recharging purposes. When the hearing aid body 30 is being recharged, the indicator 19 of the batter charger 10 will turn on to facilitate the user to recognize.

Figure 7:
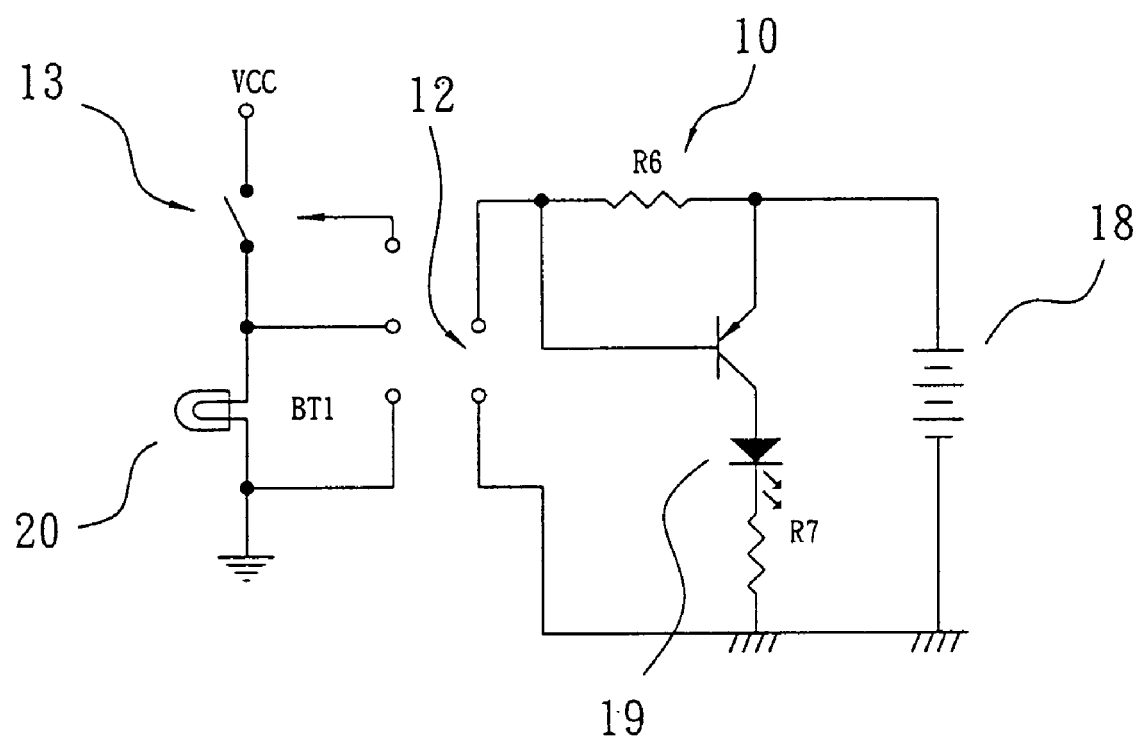
FIG. 7 is a circuit diagram of the interior of the battery charger.

As shown in FIG. 7, the circuits inside of the battery charger 10 is composed of two resistors, a chip, a light emitting-diode (indicator 19), a light 20, two contact terminals and several dry batteries 18. Wherein the light 20 is connected to the switch (provided inside, not shown) connected with the hinge element 21 and is controlled by the cover 13.

Furthermore, the power provided by the battery charger 10 mentioned in the aforesaid embodiment is from dry batteries 18 in the battery chamber 10 provided inside of the battery charger 10. In another preferred embodiment (being a prior art without shown by a drawing), the invention can be provided with an AC/DC transformer. A socket is provided at the battery charger 10 for plugging the transformed power for use at home. Being recharged by household AC power, the hearing aid body 30 can be carried with the user for use outside after completing recharge.

Although a preferred embodiment of the invention has been described above by way of example only, it will be understood by those skilled in the field that modifications may be made to the disclosed embodiment without departing from the scope of the invention, which is defined by the appended claims.

Concluded above, the invention can facilitate the user to operate the rechargeable hearing aid, curtail costs, last the life of use. The utility in commerce and industry is doubtless, as claimed by the inventor.

I claim:

1. A rechargeable hearing aid comprising:

a hearing aid body containing a charging circuit; and a battery charger, said battery charger being provided with a receiving groove and a battery chamber, said receiving groove being adapted to said hearing aid body and provided with connection terminals at two sides of said receiving groove for flexibly locking said hearing aid body, said connection terminals being connected to said battery chamber, said receiving groove being pivotally connected to a cover by way of a hinge element, said battery charger being provided below said receiving groove with a charging indicator and a light and a switch for said light being connected to said hinge element and being controlled by said cover thereby turning on and off said light by way of lifting said cover and provide rays to ease a user to dispose said hearing aid body into said receiving groove for recharging purposes, said battery charger being provided with a clamping groove for receiving a cleaning brush and a battery chamber for receiving dry batteries, said charging circuit being composed of a microphone, a plurality of resistors, electric capacitors and chips, and a receiver; one of said resistors being a variable resistor for adjusting volume of said microphone, one of said electric capacitors being able to provide electric power through dry batteries for recharging purposes, said charging indicator being turned on when said hearing aid body is being charged, said battery charger being provided with a leather case for containing said battery charger, said leather case being provided with a buckled clip for fastening to a belt of said user.

2. The rechargeable hearing aid according to claim 1, wherein said battery charger is provided with a socket for connecting with an AC/DC transformer.

\* \* \* \* \*